United States Patent
Wu

(10) Patent No.: US 12,325,299 B2
(45) Date of Patent: Jun. 10, 2025

(54) FUEL TANK CAP

(71) Applicant: COPLUS INC., Tainan (TW)

(72) Inventor: Po-Hua Wu, Tainan (TW)

(73) Assignee: COPLUS INC., Tainan (TW)

( * ) Notice: Subject to any disclaimer, the term of this patent is extended or adjusted under 35 U.S.C. 154(b) by 166 days.

(21) Appl. No.: 18/352,376

(22) Filed: Jul. 14, 2023

(65) Prior Publication Data

US 2024/0391312 A1 Nov. 28, 2024

(30) Foreign Application Priority Data

May 22, 2023 (TW) .................................. 112118939

(51) Int. Cl.
*B60K 15/04* (2006.01)

(52) U.S. Cl.
CPC .. *B60K 15/0409* (2013.01); *B60K 2015/0432* (2013.01); *B60K 2015/0451* (2013.01)

(58) Field of Classification Search
CPC ........ B60K 15/0409; B60K 2015/0432; B60K 2015/0451; B60K 2015/0438; B60K 15/05; B60K 2015/03375; B62J 35/00
USPC ......................................................... 220/288
See application file for complete search history.

(56) References Cited

U.S. PATENT DOCUMENTS

| | | | | |
|---|---|---|---|---|
| 4,529,099 A * | 7/1985 | Zerrer | ................ | B60K 15/0406 215/221 |
| 4,705,190 A * | 11/1987 | Mizusawa | .............. | B60K 15/04 220/375 |
| 5,449,086 A * | 9/1995 | Harris | ................ | B60K 15/0406 220/303 |
| 5,462,190 A * | 10/1995 | Lienhart | ................ | B60K 15/05 220/375 |
| 5,720,409 A * | 2/1998 | Asakura | ................ | B65D 55/16 220/375 |
| 6,164,482 A * | 12/2000 | Araki | ................ | B60K 15/0406 428/36.4 |
| 6,202,879 B1 * | 3/2001 | Gericke | ............. | B60K 15/0406 220/255 |
| 6,237,798 B1 * | 5/2001 | Sung | ................ | B60K 15/0406 220/375 |
| 6,332,553 B1 * | 12/2001 | Yamada | ............. | B60K 15/0406 428/36.4 |
| 6,478,180 B1 * | 11/2002 | Dehn, Sr. | ............. | B65D 47/061 215/276 |
| 6,913,163 B2 * | 7/2005 | Ishida | ................ | B60K 15/0406 220/375 |
| 7,025,222 B2 * | 4/2006 | Hagano | ............. | B60K 15/0406 220/375 |
| 7,163,117 B2 * | 1/2007 | Griffin | ............... | B60K 15/0406 220/303 |

(Continued)

*Primary Examiner* — Ernesto A Grano
(74) *Attorney, Agent, or Firm* — Burris Law, PLLC

(57) ABSTRACT

A fuel tank cap includes a seal cap body and a detaching-proof unit. The cap body has a handheld wall and a surrounding wall that extends from the handheld wall and that is formed with an engaging groove. The detaching-proof unit includes a ring sleeve member and a connection member. The ring sleeve member has an outer ring wall that surrounds the surrounding wall, and a resilient wall that extends the outer ring wall and that is engaged resiliently with the engaging groove. The connection member is connected to the ring sleeve member to be connected to a cap installation portion of a vehicle body.

17 Claims, 4 Drawing Sheets

(56) References Cited

U.S. PATENT DOCUMENTS

| | | | | |
|---|---|---|---|---|
| 7,281,640 B2* | 10/2007 | Hagano | ............... | B60K 15/0406 220/375 |
| 7,322,338 B1* | 1/2008 | Brister | ............... | B60K 15/0406 123/198 D |
| 7,338,619 B2* | 3/2008 | Hagano | ............... | B60K 15/0406 252/502 |
| 7,658,297 B2* | 2/2010 | Hagano | ............... | B60K 15/0406 180/69.5 |
| D759,787 S * | 6/2016 | Molock | ............... | D23/206 |
| 11,299,038 B2* | 4/2022 | Pecnak | ............... | B60K 15/0406 |
| 2001/0054829 A1* | 12/2001 | Hagano | ............... | B60K 15/0406 296/97.22 |
| 2003/0024931 A1* | 2/2003 | Bae | ............... | B60K 15/0406 220/375 |
| 2003/0173362 A1* | 9/2003 | Ishida | ............... | B60K 15/0406 220/375 |
| 2005/0092752 A1* | 5/2005 | Hagano | ............... | B60K 15/0406 220/375 |
| 2005/0167432 A1* | 8/2005 | Gerdes | ............... | B60K 15/0406 220/375 |
| 2007/0045322 A1* | 3/2007 | Hagano | ............... | B60K 15/0406 220/375 |
| 2007/0278231 A1* | 12/2007 | Newport | ............... | B60K 15/0406 220/375 |
| 2008/0073352 A1* | 3/2008 | Hagano | ............... | B60K 15/0406 220/375 |
| 2010/0237650 A1* | 9/2010 | Takahashi | ............... | B60K 15/0406 296/97.22 |
| 2019/0016211 A1* | 1/2019 | Novak | ............... | B60K 15/03 |
| 2020/0024041 A1* | 1/2020 | Niver | ............... | F01P 11/0238 |
| 2021/0284013 A1* | 9/2021 | Pecnak | ............... | B62D 33/02 |

* cited by examiner

FUEL TANK CAP

CROSS-REFERENCE TO RELATED APPLICATION

This application claims priority to Taiwanese Patent Application No. 112118939, filed on May 22, 2023.

FIELD

The disclosure relates to a cap, and more particularly to a fuel tank cap for vehicle tanks.

BACKGROUND

In general, a vehicle, such as a car or a motorcycle, includes a fuel tank for storage of fuel, and a fuel tank cap securely covering an opening of the fuel tank. When there is a need to refuel the fuel tank, a driver has to remove the fuel tank cap and refills the fuel tank with fuel through the opening of the fuel tank.

However, the fuel tank cap is currently designed as a separate part. When the fuel tank cap is removed from the fuel tank, the driver or a fuel attendant has to hold the fuel tank cap or place the fuel tank cap on top of the vehicle. After refueling is completed, the driver or the fuel attendant may forget to replace the fuel tank cap back onto the opening of the fuel tank, or may even lose the fuel tank cap. Hence, there is room for improvement.

SUMMARY

Therefore, an object of the disclosure is to provide a fuel tank cap that can alleviate at least one of the drawbacks of the prior art.

According to the disclosure, the fuel tank cap is adapted to be installed to a vehicle body that has a fuel tank opening and a cap installation portion, The fuel tank cap includes a seal cap unit and a detaching-proof unit.

The seal cap unit includes a locking cap body that has a handheld wall and a surrounding wall. The surrounding wall extends from a periphery of the handheld wall, is adapted to removably and sealingly cover the fuel tank opening, and is formed with an engaging groove that extends annularly along an outer surface of the surrounding wall.

The detaching-proof unit includes a ring sleeve member and a connection member. The ring sleeve member has an outer ring wall and a resilient wall. The outer ring wall surrounds the surrounding wall. The resilient wall extends obliquely from an end of the outer ring wall adjacent to the handheld wall, and is engaged resiliently with the engaging groove. The connection member is connected to the ring sleeve member and is configured to be connected to the cap installation portion of the vehicle body.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
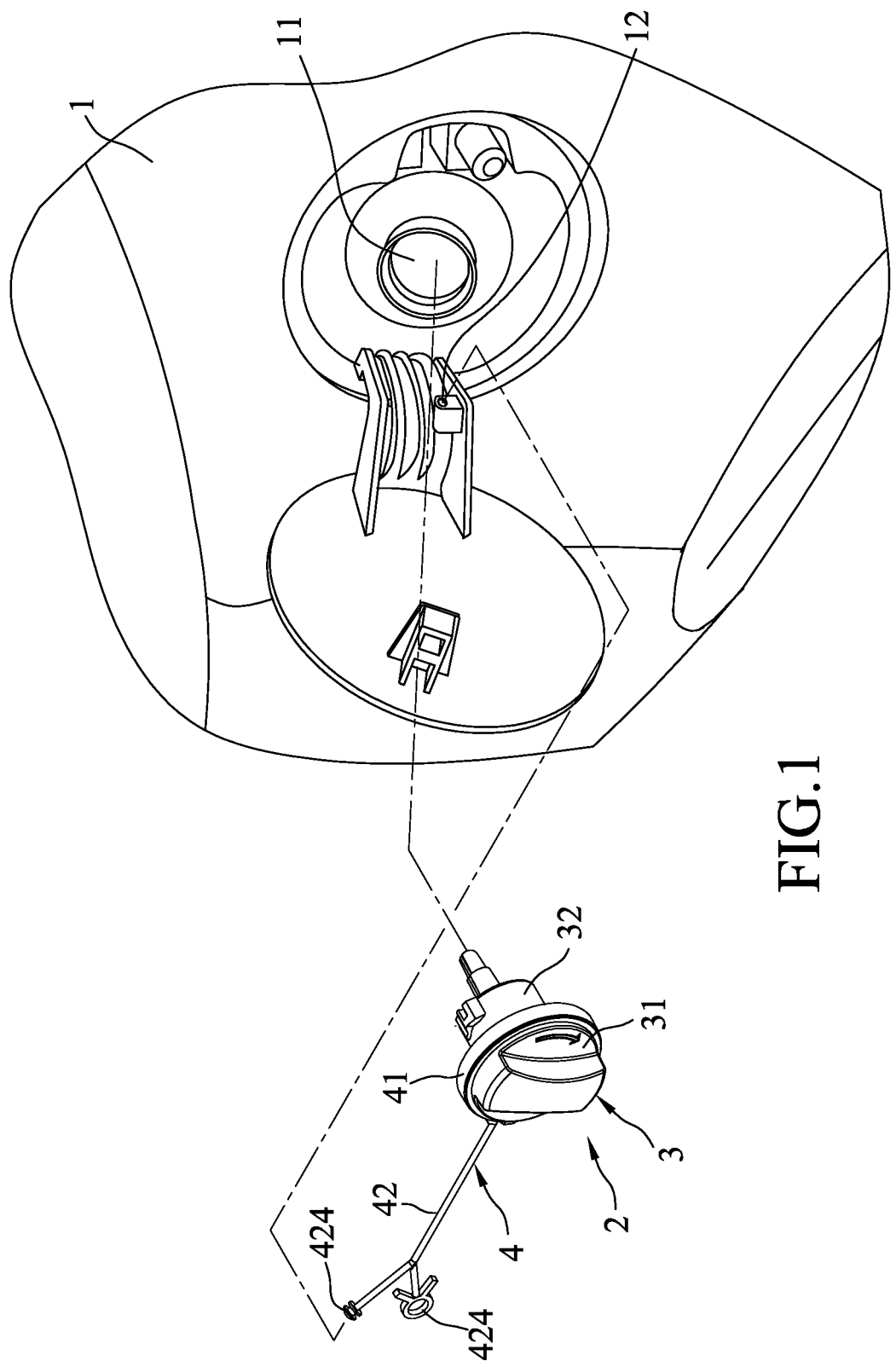
FIG. 1 is a fragmentary exploded perspective view illustrating a fuel tank of an embodiment according to the disclosure to be mounted to a vehicle body.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

FIG. 1 illustrates a fuel tank cap 2 according to an embodiment of the disclosure, which is adapted to be installed to a vehicle body 1, such as but not limited to a car or a motorcycle. In this embodiment, a car is taken as an example. The vehicle body 1 has a fuel tank opening 11 for refueling, and a cap installation portion 12 disposed adjacent to the fuel tank opening 11. The cap installation portion 12 is an installation hole disposed on a fuel tank door, but the disposition and the structure of the cap installation portion 12 may vary and are not limited hereto. Since other structures of the vehicle body 1 are not the focus of the disclosure, details thereof are omitted hereinafter.

Figure 2:
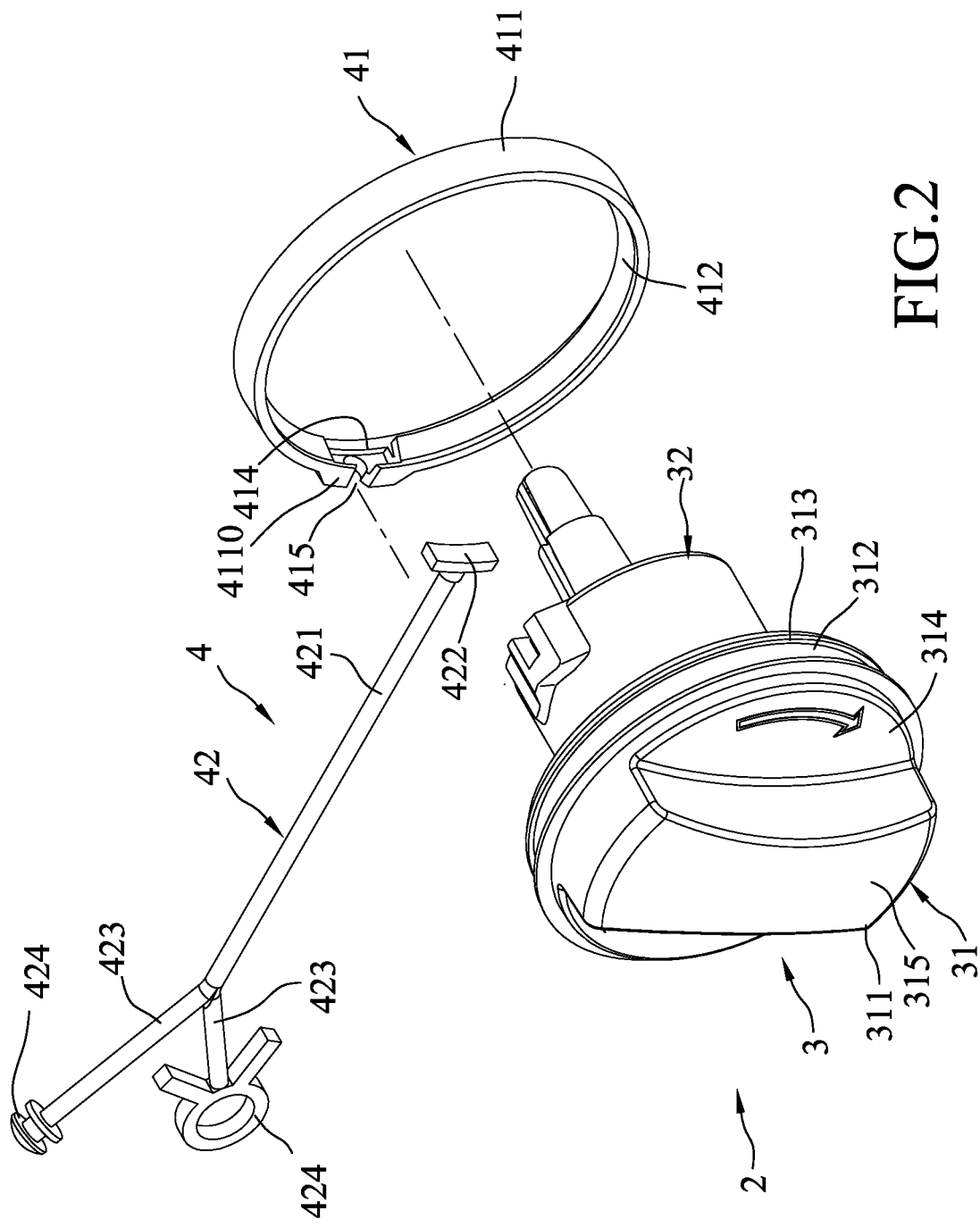
FIG. 2 is an exploded perspective view illustrating the fuel tank cap of the embodiment.
Figure 3:
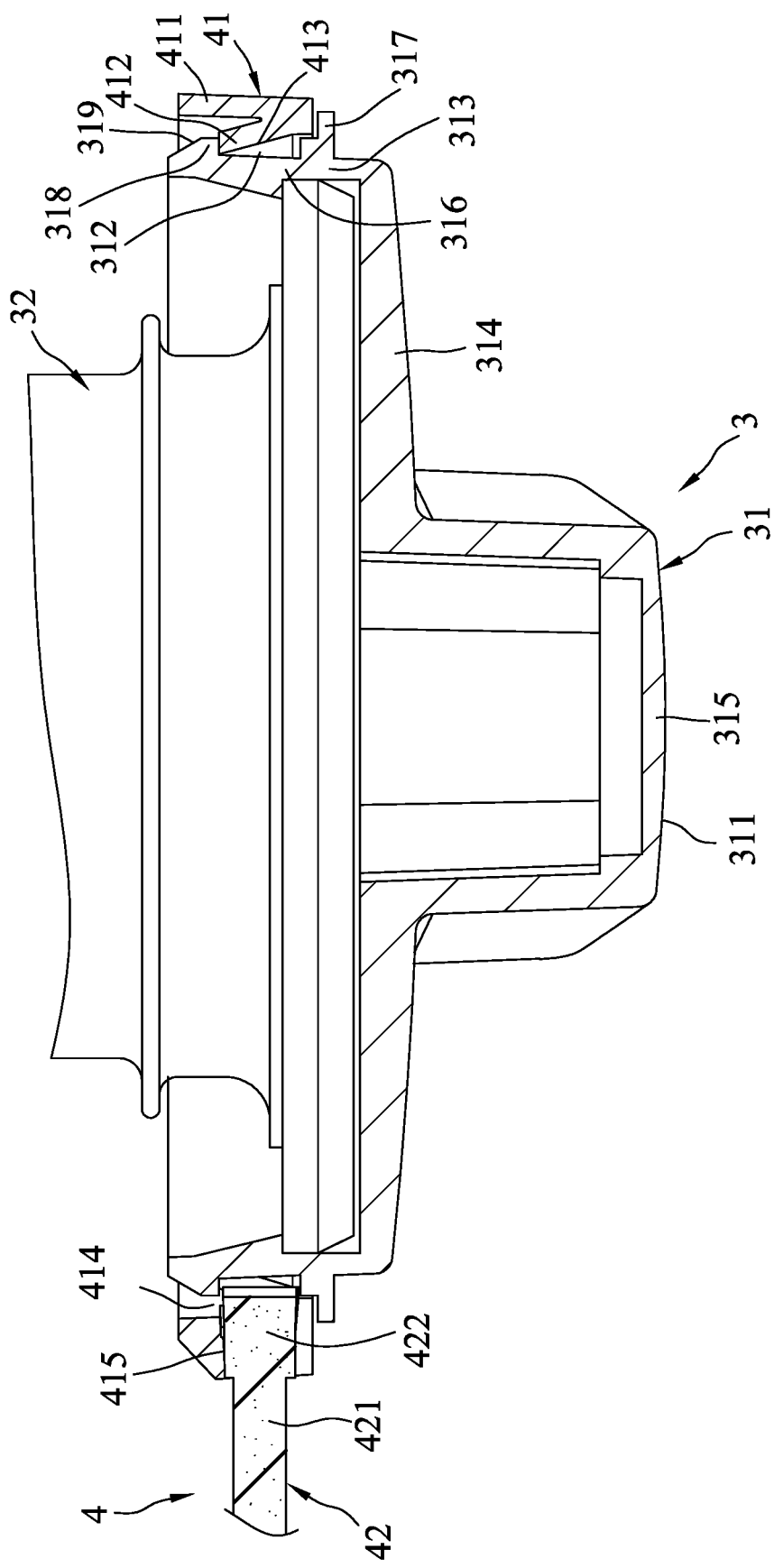
FIG. 3 is a fragmentary sectional view of the embodiment illustrating a seal cap unit and a detaching-proof unit of the fuel tank cap.

Referring to FIGS. 2 and 3 in combination with FIG. 1, the fuel tank cap 2 includes a seal cap unit 3 and a detaching-proof unit 4.

The seal cap unit 3 includes a locking cap body 31 and a locking head 32. The locking cap body 31 is made in one piece from a plastic material, and has a handheld wall 311 and a surrounding wall 313. In this embodiment, the handheld wall 311 has a circular flat plate portion 314, and a rotary button portion 315 protruding from a central portion of the circular flat plate portion 314 in a direction opposite to the fuel tank opening 11 to be held and rotated. The surrounding wall 313 extends from a periphery of the circular flat plate portion 314 of the handheld wall 311, is adapted to removably and sealingly cover the fuel tank opening 11, and is formed with an engaging groove 312 that extends annularly along an outer surface of the surrounding wall 313. The surrounding wall 313 has an annular wall portion 316, a flange portion 317, and a hook portion 318. The flange portion 317 projects outwardly around a side of the annular wall portion 316 adjacent to the handheld wall 311. The hook portion 318 projects outwardly from a side of the annular wall portion 316 distal from the handheld wall 311. The hook portion 318 of the surrounding wall 313 has an outer end that is opposite to the annular wall portion 316 and that is formed with an inclined surface 319 extending obliquely and inwardly in a direction away from the flange portion 317. The annular wall portion 316, the flange portion 317, and the hook portion 318 cooperatively define the engaging groove 312. The locking head 32 is connected to the locking cap body 31 and is adapted to be secured to the fuel tank opening 11 of the vehicle body 1. Since the structure of the locking head 32 is not the focus of the disclosure, details thereof are omitted hereafter.

The detaching-proof unit 4 connects the seal cap unit 3 to the vehicle body 1, and includes a ring sleeve member 41 and a connection member 42.

The ring sleeve member 41 is made in one piece from a plastic material, and has an outer ring wall 411 and a resilient wall 412. The outer ring wall 411 surrounds the surrounding wall 313, and has a protrusion 4110 that protrudes outwardly from the surrounding wall 313. The flange portion 317 abuts against an end of the outer ring wall 411 that is adjacent to the handheld wall 311. The resilient wall 412 extends obliquely from the end of the outer ring wall 411 adjacent to the handheld wall 311, and is engaged resiliently with the engaging groove 312. The resilient wall 412 has an inner end that is opposite to the outer ring wall 411 and that is formed with an incline-guide surface 413 extending obliquely and inwardly in the direction away from the flange portion 317. The hook portion 318 abuts against an end of the resilient wall 412 that is distal from the end of the outer ring wall 411 that is adjacent to the handheld wall 311. During assembling of the ring sleeve member 41 and the surrounding wall 313, when the inclined surface 319 of the hook portion 318 abuts against the resilient wall 412 by moving along the incline-guide surface 413 of the resilient wall 412, the resilient wall 412 is bent resiliently toward the outer ring wall 411. When the hook portion 318 passes the resilient wall 412, the resilient wall 412 is resiliently restored and engaged with the engaging groove 312. Because the hook portion 318 abuts against the end of the resilient wall 412 that is distal from the end of the outer ring wall 411 that is adjacent to the handheld wall 311, when assembling of the ring sleeve member 41 and the surrounding wall 313 is completed, the ring sleeve member 41 and the surrounding wall 313 are prevented from being detached from each other.

Figure 4:
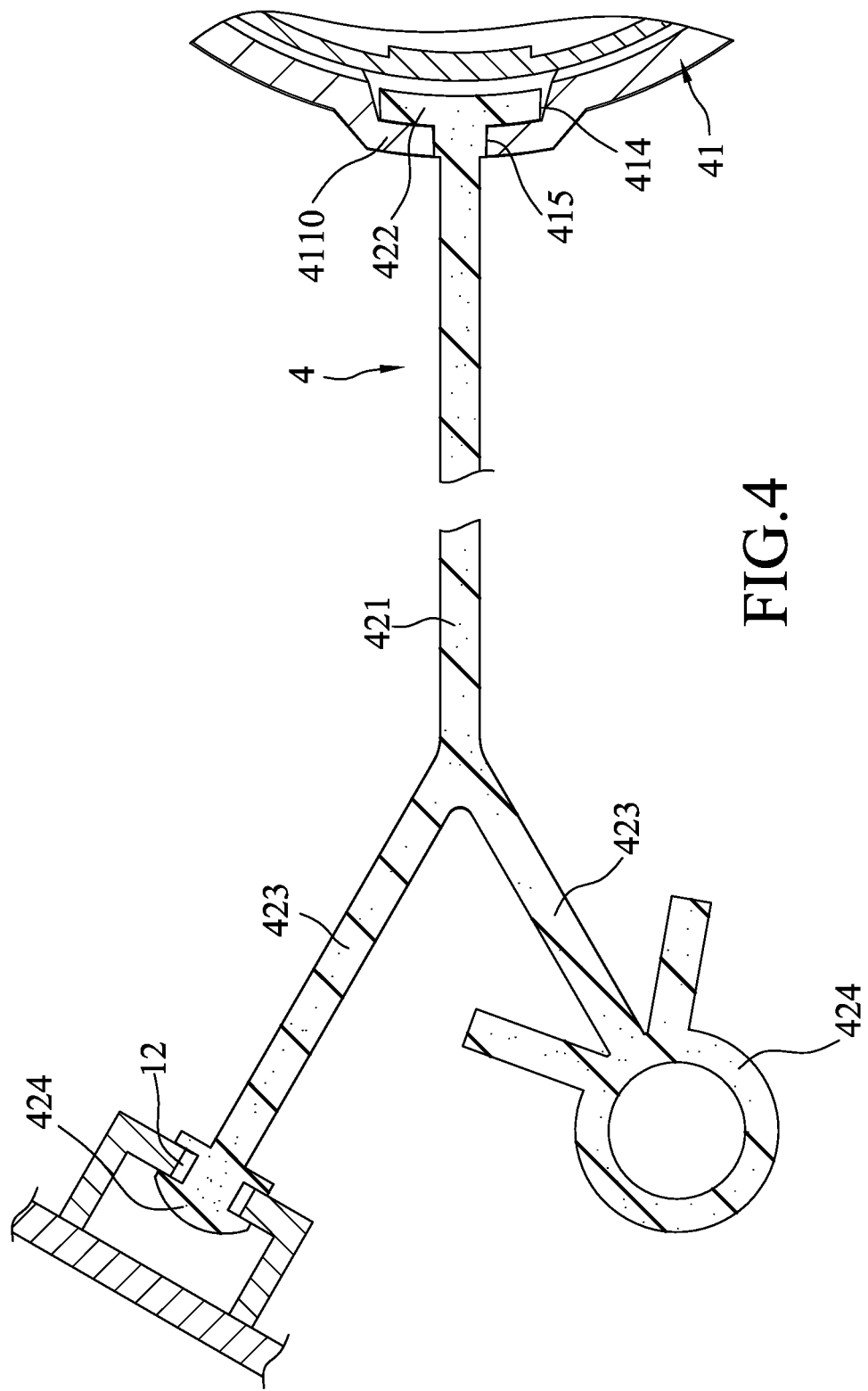
FIG. 4 is a fragmentary sectional view of the embodiment illustrating the detaching-proof unit.

Referring to FIG. 4 in combination with FIGS. 1 and 2, the ring sleeve member 41 further has an insertion recess 414 and a neck recess 415. The neck recess 415 is formed in the protrusion 4110 of the outer ring wall 411, is in spatial communication with the insertion recess 414, and is smaller in width than the insertion recess 414.

The connection member 42 is connected to the ring sleeve member 41 and is configured to be connected to the cap installation portion 12 of the vehicle body 1. In this embodiment, the connection member 42 is made in one piece from a plastic material, and has a connection rod portion 421, two branch portions 423, a fastening portion 422, and two attaching portions 424. The connection rod portion 421 is flexible and engages the neck recess 415. The branch portions 423 are connected to an end of the connection rod portion 421 opposite to the ring sleeve member 41 and diverge from each other. The fastening portion 422 is connected to another end of the connection rod portion 421, engages the insertion recess 414, and is constrained by the locking cap body 31 from being removed from the insertion recess 414. The attaching portions 424 are disposed respectively on the branch portions 423, and are structurally different from each other. One of the attaching portions 424 is adapted to be attached to the cap installation portion 12 of the vehicle body 1 so as to be widely applicable. Notably, the branch portions 423 and the attaching portions 424 are equal in number to each other. However, the number of the branch portions 423 and the attaching portions 424 are not limited two and may be one, three or more.

In summary, by virtue of the detaching-proof unit 4 connecting the seal cap unit 3 to the vehicle body 1 in design of the fuel tank cap 2, when the seal cap unit 3 is removed from the vehicle body 1, because the connection member 42 is connected to the vehicle body 1, the seal cap unit 3 is prevented from being detached or falling to be lost.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A fuel tank cap adapted to be installed to a vehicle body that has a fuel tank opening and a cap installation portion, said fuel tank cap comprising:
    a seal cap unit including a locking cap body that has
        a handheld wall, and
        a surrounding wall extending from a periphery of said handheld wall, adapted to removably and sealingly cover the fuel tank opening, and formed with an engaging groove that extends annularly along an outer surface of said surrounding wall; and
    a detaching-proof unit including
        a ring sleeve member that has
            an outer ring wall surrounding said surrounding wall, and
            a resilient wall extending obliquely from an end of said outer ring wall adjacent to said handheld wall, and engaged resiliently with said engaging groove, and
        a connection member that is connected to said ring sleeve member and that is configured to be connected to the cap installation portion of the vehicle body;
    wherein said surrounding wall of said locking cap body has
        an annular wall portion,
        a flange portion that projects outwardly around a side of said annular wall portion adjacent to said handheld wall, and a hook portion that projects outwardly from a side of said annular wall portion distal from said handheld wall;

wherein said annular wall portion, said flange portion, and said hook portion cooperatively define said engaging groove;

wherein said flange portion abuts against said end of said outer ring wall that is adjacent to said handheld wall; and wherein said hook portion abuts against an end of said resilient wall that is distal from said end of said outer ring wall that is adjacent to said handheld wall.

2. The fuel tank cap as claimed in claim 1, wherein:
said hook portion of said surrounding wall has an outer end that is opposite to said annular wall portion and that is formed with an inclined surface extending obliquely and inwardly in a direction away from said flange portion; and
said resilient wall has an inner end that is opposite to said outer ring wall and that is formed with an incline-guide surface extending obliquely and inwardly in the direction away from said flange portion.

3. The fuel tank cap as claimed in claim 1, wherein:
said connection member has
a connection rod portion that is flexible,
at least one branch portion that is connected to an end of said connection rod portion opposite to said ring sleeve member, and
at least one attaching portion that is disposed on said at least one branch portion;
said at least one branch portion and said at least one attaching portion are equal in number to each other; and
said at least one attaching portion is adapted to be attached to the cap installation portion of the vehicle body.

4. The fuel tank cap as claimed in claim 3, wherein:
said at least one branch portion of said connection member includes a plurality of branch portions;
said at least one attaching portion of said connection member includes a plurality of attaching portions that are structurally different from each other; and
one of said attaching portions is adapted to be attached to the cap installation portion of the vehicle body.

5. The fuel tank cap as claimed in claim 3, wherein:
said outer ring wall has a protrusion that protrudes outwardly;
said ring sleeve member further has
an insertion recess, and
a neck recess that is formed in said protrusion of said outer ring wall, that is in spatial communication with said insertion recess, and that is smaller in width than said insertion recess;
said connection member further has
a fastening portion that is connected to another end of said connection rod portion, that engages said insertion recess, and that is constrained by said locking cap body from being removed from said insertion recess; and
said connection rod portion engages said neck recess.

6. The fuel tank cap as claimed in claim 5, wherein said connection member is made in one piece from a plastic material.

7. The fuel tank cap as claimed in claim 1, wherein said ring sleeve member is made in one piece from a plastic material.

8. The fuel tank cap as claimed in claim 1, wherein said locking cap body is made in one piece from a plastic material.

9. The fuel tank cap as claimed in claim 1, wherein said seal cap unit further includes a locking head that is connected to said locking cap body and that is adapted to be secured to the fuel tank opening of the vehicle body.

10. A fuel tank cap adapted to be installed to a vehicle body that has a fuel tank opening and a cap installation portion, said fuel tank cap comprising:
a seal cap unit including a locking cap body that has
a handheld wall, and
a surrounding wall extending from a periphery of said handheld wall, adapted to removably and sealingly cover the fuel tank opening, and formed with an engaging groove that extends annularly along an outer surface of said surrounding wall; and
a detaching-proof unit including
a ring sleeve member that has
an outer ring wall surrounding said surrounding wall, and
a resilient wall extending obliquely from an end of said outer ring wall adjacent to said handheld wall, and engaged resiliently with said engaging groove, and
a connection member that is connected to said ring sleeve member and that is configured to be connected to the cap installation portion of the vehicle body;
wherein said connection member has
a connection rod portion that is flexible,
at least one branch portion that is connected to an end of said connection rod portion opposite to said ring sleeve member, and
at least one attaching portion that is disposed on said at least one branch portion;
wherein said at least one branch portion and said at least one attaching portion are equal in number to each other; and
wherein said at least one attaching portion is adapted to be attached to the cap installation portion of the vehicle body.

11. The fuel tank cap as claimed in claim 10, wherein:
said surrounding wall of said locking cap body has
an annular wall portion,
a flange portion that projects outwardly around a side of said annular wall portion adjacent to said handheld wall, and
a hook portion that projects outwardly from a side of said annular wall portion distal from said handheld wall;
said annular wall portion, said flange portion, and said hook portion cooperatively define said engaging groove;
said flange portion abuts against said end of said outer ring wall that is adjacent to said handheld wall;
said hook portion abuts against an end of said resilient wall that is distal from said end of said outer ring wall that is adjacent to said handheld wall;
said hook portion of said surrounding wall has an outer end that is opposite to said annular wall portion and that is formed with an inclined surface extending obliquely and inwardly in a direction away from said flange portion; and
said resilient wall has an inner end that is opposite to said outer ring wall and that is formed with an incline-guide surface extending obliquely and inwardly in the direction away from said flange portion.

12. The fuel tank cap as claimed in claim 10, wherein:
said at least one branch portion of said connection member includes a plurality of branch portions;

said at least one attaching portion of said connection member includes a plurality of attaching portions that are structurally different from each other; and one of said attaching portions is adapted to be attached to the cap installation portion of the vehicle body.

13. The fuel tank cap as claimed in claim 10, wherein:

said outer ring wall has a protrusion that protrudes outwardly;

said ring sleeve member further has
 an insertion recess, and
  a neck recess that is formed in said protrusion of said outer ring wall, that is in spatial communication with said insertion recess, and that is smaller in width than said insertion recess;

said connection member further has
 a fastening portion that is connected to another end of said connection rod portion, that engages said insertion recess, and that is constrained by said locking cap body from being removed from said insertion recess; and said connection rod portion engages said neck recess.

14. The fuel tank cap as claimed in claim 13, wherein said connection member is made in one piece from a plastic material.

15. The fuel tank cap as claimed in claim 10, wherein said ring sleeve member is made in one piece from a plastic material.

16. The fuel tank cap as claimed in claim 10, wherein said locking cap body is made in one piece from a plastic material.

17. The fuel tank cap as claimed in claim 10, wherein said seal cap unit further includes a locking head that is connected to said locking cap body and that is adapted to be secured to the fuel tank opening of the vehicle body.

* * * * *